May 19, 1970
J. B. HARRIS
3,512,810
HOSE FITTING HAVING A DEFORMABLE SOCKET
Filed May 22, 1969
2 Sheets-Sheet 1
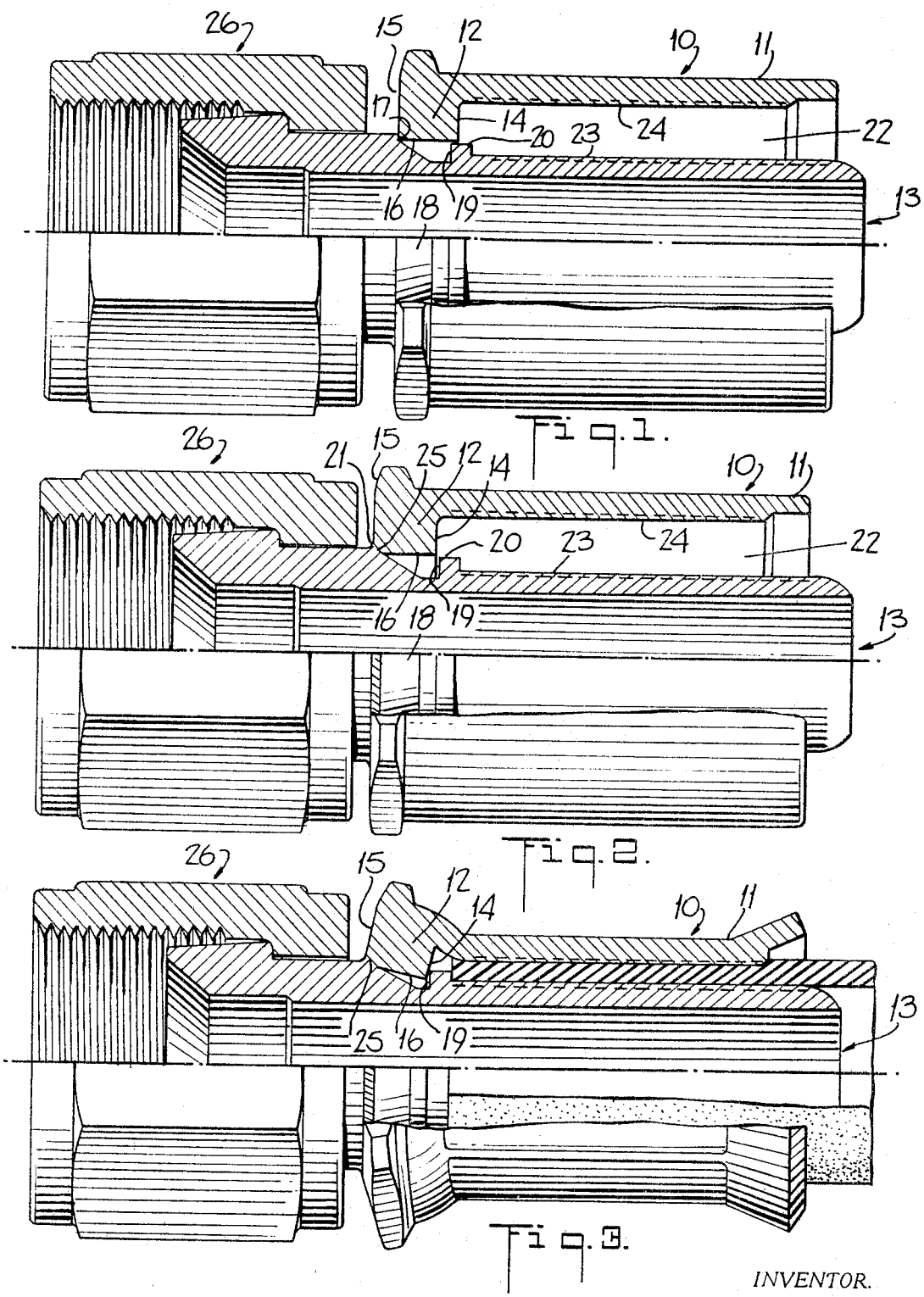

May 19, 1970   J. B. HARRIS   3,512,810
HOSE FITTING HAVING A DEFORMABLE SOCKET
Filed May 22, 1969   2 Sheets-Sheet 2

INVENTOR.
JOHN B. HARRIS
BY
Ward McEllannon Brooks + Fitzpatrick
ATTORNEYS

United States Patent Office 3,512,810
Patented May 19, 1970

3,512,810
HOSE FITTING HAVING A DEFORMABLE SOCKET
John B. Harris, Clifton, N.J., assignor to Resistoflex Corporation, Roseland, N.J., a corporation of New York
Continuation-in-part of application Ser. No. 666,249, Sept. 8, 1967. This application May 22, 1969, Ser. No. 826,929
Int. Cl. F16l 13/02, 33/20
U.S. Cl. 285—256          10 Claims

ABSTRACT OF THE DISCLOSURE

The radially inner edge adjacent the exterior of the flange on a fitting socket is welded to an abutment on the nipple providing an annular web of limited cross-section therebetween. The nipple is provided with a channel or groove adjacent the abutment and underlying the flange. When the socket is radially contracted the flange deforms and bends about the web penetrating the groove in the nipple. The groove has a side wall which then provides an interlock with the flange.

---

This application is a continuation-in-part of my co-pending application Ser. No. 666,249 filed Sept. 8, 1967 and now abandoned.

The present invention relates to a hose fitting and, more particularly, to a fitting of the type having a nipple for insertion within the end of a hose and a socket for squeezing the hose wall against the nipple. Fittings of this type are generally referred to as swaged or crimped.

The purpose of a hose fitting is to both anchor a coupling or the like to the end of a hose and establish a satisfactory fluid seal. In order to assemble the fitting parts on the end of a hose, it is necessary that their initial dimensions be such as to make a slip fit with the hose. The socket is then subjected to substantial reduction in girth to effect the necessary grip upon the hose wall. For manufacturing reasons, generally it is not practical nor economical to fabricate the fitting in one piece. However, it is essential for satisfactory fitting operation that the socket and nipple be adequately united during the assembly thereof to prevent separation in use. For example, a good percentage of the blow-off resistance would be lost if the socket was free to move axially relative to the nipple after assembly.

Heretofore, various means have been employed to achieve a mechanical interlock between the nipple and socket. A common method is to provide threaded engagement therebetween. Providing the necessarily short threads on the nipple and socket has, however, proven a costly procedure. Furthermore, experience has shown that often in use the nipple has a rotational stress applied thereto which can result in loosening of the fitting.

It is, therefore, an object of the present invention to provide a fitting of the above type which is more economical to manufacture and, yet, overcomes the deficiencies of the prior art.

In accordance with the invention there is provided an end fitting for attachment to an end of a hose comprising a one-piece tubular structure including a socket portion and a nipple portion defining an annular chamber therebetween with a radial dimension sufficient to permit insertion of a hose end, the socket portion having a radially inwardly directed flange at its inner end, the radially inner edge adjacent the exterior of the flange being joined to the nipple portion by an annular web of limited cross-section preventing relative rotation between the nipple and socket portion, the nipple portion having an annular groove adjacent the web and underlying the flange with an interior side wall located on the opposite side of the groove from the web to interlock with an interior side wall of the flange when the flange is bent about the web and penetrates the groove upon radial contraction of the socket portion about an interfitted hose end, the interlock when perfected preventing axial separation of the nipple and socket portions in case of fracture of the web.

The invention will be better understood after reading the following detailed description of the presently preferred embodiment thereof with reference to the accompanying drawings in which:

FIG. 1 is an elevational view partly in section showing the nipple and socket members of the fitting at an initial stage in the fabrication thereof;

FIG. 2 is a view similar to FIG. 1 showing the fitting after fabrication is completed;

FIG. 3 is a view partly in section showing the fitting assembled on the end of the hose;

Throughout the drawings the same reference numerals will be used to designate the same or similar parts.

Figure 4:
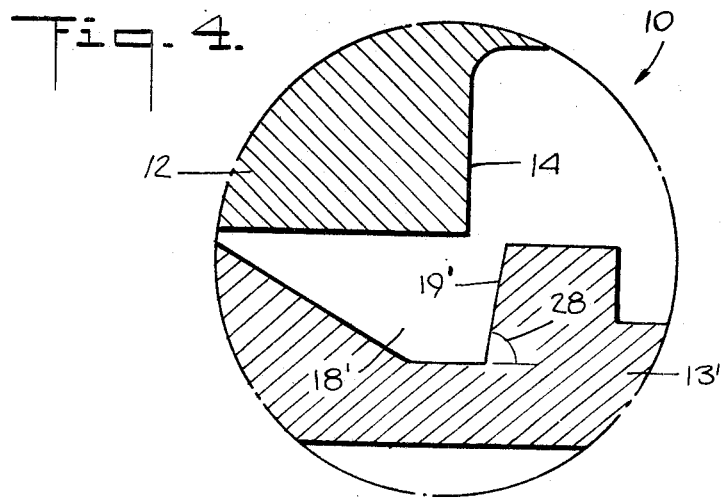
FIG. 4 is an enlarged sectional view showing a modification of the nipple as employed in FIGS. 1 to 3 prior to assembly on a hose end.

Referring to FIG. 1 of the drawings, the hose fitting is fabricated from a socket member, designated generally by the numeral 10, which has a cylindrical body portion 11 for surrounding the end of a hose and a radially inwardly directed flange 12 at one end, and a tubular nipple member designated generally by the numeral 13. The flange 12 is provided with interior and exterior side or radial surfaces 14 and 15, respectively, and terminates in a cylindrical surface 16 concentric with the longitudinal axis of the socket member 10.

The socket member 10 is interfitted with the nipple member 13. It will be observed that the member 13 passes through the flange 12 of the socket member until the exterior surface 15 of the flange encounters an abutment 17 on the nipple member 13. The nipple member 13 has an annular groove 18 formed in its surface adjacent the abutment 17 so as to underlie the cylindrical surface 16 of the flange 12 when the abutment 17 is engaged by the socket member 10. It is sufficient to note at this point that the groove 18 in the nipple member 13 has a radially directed side wall 19 which is spaced axially from the abutment 17 a distance slightly less than the thickness of the flange 12. The margin of the groove adjacent the radially directed wall 19 has a cylindrical surface 20 making approximately a slip fit with the cylindrical surface 16 of the socket member 10. The amount of overlap between the surfaces 16 and 20 as seen in FIG. 1 is somewhat critical. Its significance will be appreciated when the subsequent steps in the manufacture are explained.

The next step in the fabrication of the fitting involves welding the socket member 10 to the nipple member 13 along the line of contact between the flange 12 and the abutment 17. It has been found that this can be accomplished best by means of projection welding. For this purpose the surface area of the abutment 17 must be maintained small in order that the welding heat be concentrated at the interface between the parts.

As is well known, in projection welding it is necessary to develop pressure between the parts to be welded, and to pass large currents therethrough. Because the metal does flow somewhat there will occur slight but controllable axial penetration of the nipple into the socket. The completed assembly should look generally as shown in FIG. 2. It has been found that an allowance of .020 inch for axial travel is sufficient. As shown in FIG. 2, a slight fillet is develped at 21 due to the displacement of the metal, and the surface 14 of the flange now overlies the groove 18 rather than the cylindrical surface 20 on the nipple. For a reason which will be understood later on, the spacing between the plane of the surface 14 and the plane of the wall 19 should be on the order of .005 inch.

When it is desired to attach the fitting of FIG. 2 to a hose, the hose is inserted in the annular chamber 22 formed in the end of the fitting between the nipple member and the socket member. This chamber is bounded by the radially inner and outer wall surfaces 23 and 24, respectively, and by the bottom wall surface 14. The cylindrical surface 20 may be considered as a part of the surface 23.

After inserting the hose in the chamber, radial crimping or swaging dies are applied to the exterior of the socket member 10 to deform the same into the condition shown in FIG. 3. During the process of deformation of the socket the flange portion 12 tends to cup or bend about the annular web 25 which is of limited cross-section. The web 25 is the product produced by welding the flange 12 to the nipple member 13. As a result of the cupping or deformation of the flange 12 the radially inner portion thereof penetrates the groove 18 such that a part of the wall surface 14 moves behind and interlocks with the radial wall surface 19.

So long as the weld remains intact the fitting may be considered as one piece free from any danger of relative rotation between the nipple member and the socket member. If the weld should fail, the two members are still mechanically interlocked against axial separation by reason of the inter-engagement between the flange and the shoulder provided by the wall surface 19.

In the fitting so far described herein, the surface 20 on the nipple member has a larger diameter than the remainder of the surface 23 which penetrates the hose. This relationship is desirable in order to minimize the wall thickness of the nipple. This is an important consideration where weight is of prime concern.

Any suitable grooving or other irregularity may be provided on the surfaces 23 and 24 in known manner for gripping and establishing the necessary seal with the hose.

Referring to the completed fitting as seen in FIG. 2, it will be observed that the groove 18 in the nipple member cooperates with the flange 12 of the socket member to provide an annular cavity located at the intersection of the inner wall surface 23 and the bottom wall surface 14. The cavity is bounded by the substantially cylindrical wall surface 16 which extends axially inwardly from the bottom wall surface 14 and the substantially radial wall surface 19 which extends inwardly from the inner wall surface 23 (it being understood that the surface 20 is a part of the surface 23).

For the purposes of illustration, the fitting has been shown in the drawings as provided with a female coupling part 26 mounted on the end of the nipple member which extends beyond the socket member. This portion of the fitting is conventional.

As shown in the drawings, the groove 18 in the nipple member consists of a conical wall section and a cylindrical wall section. This is somewhat arbitrary and may be altered so long as the cavity resulting upon welding the socket to the nipple is adequate to receive the flange of the socket member when it is deformed during swaging.

In the embodiment of the invention described with reference to FIGS. 1 to 3 the side wall 19 of the groove 18 in the nipple is perpendicular to the longitudinal axis of the fitting. It may be found, however, that it is not economic to maintain the necessary tolerances in manufacture to ensure that the interior side wall 14 of the socket flange is properly disposed after welding relative to the side wall 19 of the groove in the nipple to achieve the requisite interlock upon swaging. This problem can be avoided without detracting from the efficacy of the resultant assembly by inclining the side wall 19' slightly, as shown in FIGS. 4 and 5, or to a greater extent as shown in FIG. 6.

For fittings smaller than dash 10 in size a slight inclination of the side wall 19' is sufficient. In practice, an inclination of 81° to the fitting axis has proven satisfactory for the angle 28 in FIGS. 4 and 5.

Figure 5:
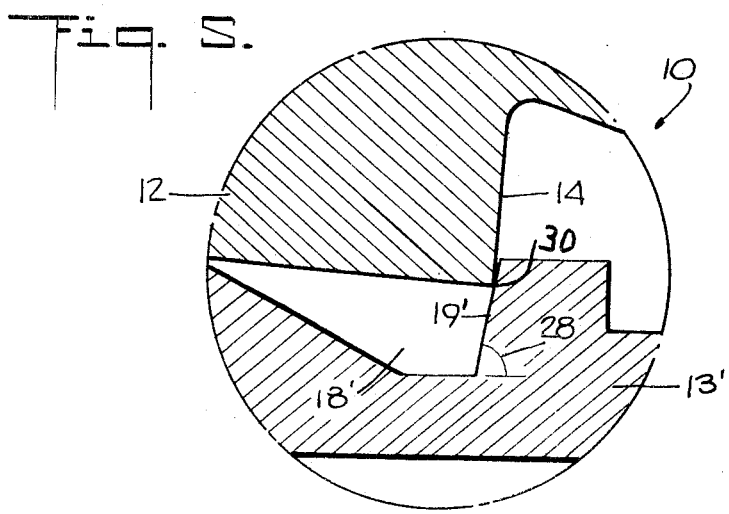
FIG. 5 is an enlarged sectional view similar to FIG. 4 but after perfecting the interlock, and reflecting poor control of dimensional tolerances.

While FIG. 4 is somewhat distorted for clarity of illustration, it is to be understood that the relationship between side walls 14 and 19' and the respective distances to the "hinge" point (the web 25 seen in FIG. 2) are preferably chosen such that some engagement occurs between the two side walls upon swaging of the fitting and penetration of the flange 12 into the groove 18' in nipple member 13'. In FIG. 5 this is shown for a condition of near extreme tolerance variation with the radially inner edge 30 of side wall 14 penetrating only slightly into the groove 18'. Normally, although not shown in FIG. 5, the edge 30 would bite into the side wall 19' resulting in somewhat deeper penetration.

Figure 6:
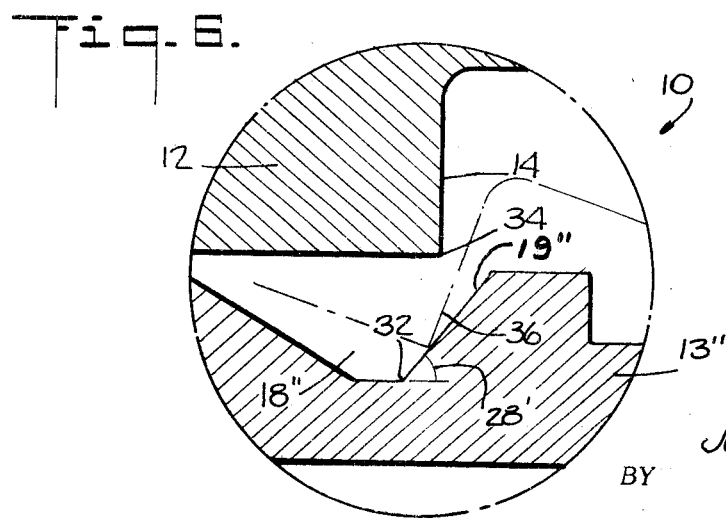
FIG. 6 is an enlarged sectional view showing a further modification of the nipple.

For larger than dash 8 size fittings, as best seen in FIG. 6, an angle 28' of 51° has been employed satisfactorily with, however, the root marginal edge of side wall 19" or intersection 32 being located in a plane behind the plane of the surface 14 prior to swaging. Typically, the side wall 14 with its radially inner edge 34 is located in a plane having a location axially of the fitting about half way between the respective planes of the edge 32 and the upper or crest marginal edge of side wall 19". Thus, after deformation of the socket portion the interior side wall 14 will penetrate the groove 18" so that part of the side wall 14 moves behind and interlocks with the side wall 19" of member 13" as shown by the broken lines in FIG. 6, as at 36.

This invention has been described with reference to the presently preferred embodiment thereof. It should be apparent that various changes may be made therein without departing from the true spirit of the invention.

What is claimed is:

1. An end fitting for attachment to an end of a hose comprising a one-piece tubular structure including a socket portion and a nipple portion defining an annular chamber therebetween with a radial dimension sufficient to permit insertion of a hose end, said socket portion having a radially inwardly directed flange at its inner end, the radially inner edge adjacent the exterior of said flange being joined to said nipple portion by an annular web of limited cross-section preventing relative rotation between said nipple and socket portions, said nipple portion having an annular groove adjacent said web and underlying said flange with a radial side wall located on the opposite side of said groove from said web to interlock with a radial interior wall of said flange when the flange is bent about said web and penetrates said groove upon radial contraction of the socket portion about an interfitted hose end, said interlock when perfected preventing axial separation of said nipple and socket portions in case of fracture of said web.

2. A hose fitting according to claim 1, wherein said web is the result of welding said flange to said nipple portion.

3. An end fitting according to claim 1, wherein said flange terminates in a cylindrical surface concentric with the longitudinal axis of said socket portion and intersecting said radial interior wall thereof.

4. An end fitting according to claim 3, wherein the diameter of said nipple portion immediately adjacent said groove and bordering said radial side wall thereof is approximately equal to the diameter of said cylindrical surface of the flange.

5. An end fitting according to claim 4, wherein said web is the result of welding said flange to an abutment on said nipple portion.

6. An end fitting and hose assembly comprising a one-piece tubular structure including a socket portion and a nipple portion defining an annular chamber therebetween, an end of a length of hose disposed over said nipple portion within said chamber, said socket portion having a section radially contracted about said hose end compressing the hose wall against said nipple portion, the end of said socket portion beyond the end of said hose terminating in a radially inwardly directed flange whose radially inner edge adjacent the exterior thereof is joined to said nipple portion by an annular web of limited cross-section preventing relative rotation between said nipple and socket portions, said nipple portion beyond the end of said hose having an annular groove adjacent said web and underlying said flange with a radial side wall located on the opposite side of said groove from said web in interlocking relation relative to a radial interior wall of said flange, said flange being cupped and bent about said web with its radially inner interior edge projecting into said groove as a result of said contraction of said section of the socket portion, said interlock preventing axial separation of said nipple and socket portions in case of fracture of said web.

7. An end fitting for attachment to an end of a hose comprising a one-piece tubular structure including a socket portion and a nipple portion defining an annular chamber therebetween with a radial dimension sufficient to permit insertion of a hose end, said socket portion having a radially inwardly directed flange at its inner end, the radially inner edge adjacent the exterior of said flange being joined to said nipple portion by an annular web of limited cross-section preventing relative rotation between said nipple and socket portions, said nipple portion having an annular groove adjacent said web and underlying said flange with a side wall located on the opposite side of said groove from said web to interlock with an interior side wall of said flange when the flange is bent about said web and penetrates said groove upon radial contraction of the socket portion about an interfitted hose end, said interlock when perfected preventing axial separation of said nipple and socket portions in case of fracture of said web.

8. An end fitting according to claim 7, wherein said side wall of said groove is inclined at an angle of between about 51 degrees and about 81 degrees with respect to the fitting axis.

9. An end fitting according to claim 7, wherein said side wall of said groove is disposed at an angle of about 81 degrees with respect to the fitting axis.

10. An end fitting according to claim 7, wherein said side wall of said groove is disposed at an angle of about 51 degrees with respect to the fitting axis with the radially inner edge of the interior side wall of said flange lying in a plane midway between the planes of the root and crest marginal edges of said side wall of said groove.

References Cited

UNITED STATES PATENTS

| | | | |
|---|---|---|---|
| 1,908,020 | 5/1933 | Hulsart | 285—286 X |
| 2,121,624 | 6/1938 | Cowles | 285—256 |
| 2,133,313 | 10/1938 | Weatherhead | 285—256 |
| 2,535,460 | 12/1950 | Rotter et al. | 285—256 X |
| 2,685,458 | 8/1954 | Shaw | 285—256 X |
| 2,926,029 | 2/1960 | St. Clair et al. | 285—256 |
| 3,345,090 | 10/1967 | Weatherhead et al. | 285—256 |

FOREIGN PATENTS

| | | |
|---|---|---|
| 677,843 | 8/1952 | Great Britain. |
| 969,875 | 9/1964 | Great Britain. |

THOMAS F. CALLAGHAN, Primary Examiner

U.S. Cl. X.R.

285—286